United States Patent
Lim et al.

(10) Patent No.: US 7,433,353 B2
(45) Date of Patent: Oct. 7, 2008

(54) DATA FRAME CONSTRUCTION METHOD AND DATA PROCESSING METHOD ACCORDING TO DATA FRAME IN SYNCHRONOUS ETHERNET

(75) Inventors: Se-Youn Lim, Seoul (KR); Jae-Yeon Song, Seoul (KR); Seo-Won Kwon, Seoul (KR); Jong-Ho Yoon, Goyang-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 666 days.

(21) Appl. No.: 11/007,043

(22) Filed: Dec. 8, 2004

(65) Prior Publication Data

US 2005/0265332 A1     Dec. 1, 2005

(30) Foreign Application Priority Data

May 14, 2004 (KR) ............... 10-2004-0034379

(51) Int. Cl.
H04L 12/56     (2006.01)
H04J 3/16      (2006.01)
G06F 15/16     (2006.01)

(52) U.S. Cl. .................. 370/389; 370/471; 709/236
(58) Field of Classification Search .............. None
See application file for complete search history.

(56) References Cited

U.S. PATENT DOCUMENTS 5,758,075 A * 5/1998 Graziano et al. ........ 709/250
6,798,784 B2 * 9/2004 Dove et al. ............. 370/463
2003/0214928 A1 * 11/2003 Chuah ..................... 370/336
2005/0036478 A1 * 2/2005 Neilson et al. ........... 370/350
2005/0226274 A1 * 10/2005 Kwon et al. ............. 370/474
2005/0265332 A1 * 12/2005 Lim et al. ................ 370/389
2006/0182144 A1 * 8/2006 Dove et al. .............. 370/470

FOREIGN PATENT DOCUMENTS

JP      2001-333080      11/2001

* cited by examiner

Primary Examiner—Wing F. Chan
Assistant Examiner—Gregory B Sefcheck
(74) Attorney, Agent, or Firm—Cha & Reiter, LLC (57) ABSTRACT

Disclosed is a method for constructing a frame of data for transmission by each Ethernet device in a synchronous Ethernet, which comprising the steps of receiving the data for transmission and confirming whether or not the data for transmission are synchronous data, when the received data are synchronous data, marking that the data are synchronous data in a preamble of the frame and constructing a synchronous frame by including the received data into a data portion of the frame which does not contain a MAC header and when the received data are asynchronous data, marking that the data are asynchronous data in the preamble of the frame and constructing an asynchronous frame by including the received data into a data portion of the frame containing a MAC header.

14 Claims, 6 Drawing Sheets

DATA FRAME CONSTRUCTION METHOD AND DATA PROCESSING METHOD ACCORDING TO DATA FRAME IN SYNCHRONOUS ETHERNET

CLAIM OF PRIORITY

This application claims priority to that patent application entitled "Data Frame Construction Method And Data Processing Method According To Data Frame In Synchronous Ethernet," filed in the Korean Intellectual Property Office on May 14, 2004 and assigned Ser. No. 2004-34379, the contents of which are hereby incorporated by reference.

BACKGROUND OF THE INVENTION

1. Field of the Invention

The present invention relates to network communication protocols and more particularly to a synchronous Ethernet capable of simultaneously providing a real-time service and a non-real-time service.

2. Description of the Related Art

Ethernet is the most widely used local area network technology and is now defined as a standard in an Institute of Electrical and Electronics Engineers ('IEEE') 802.3. However, Ethernet has been originally developed by Xerox and has been advanced by Xerox, Digital Equipment Corporation (DEC), Intel, and other similar companies.

In the conventional Ethernet, since a competitive access is accomplished by means of a carrier sense multiple access/collision detect (CSMA/CD) protocol stipulated in an IEEE 802.3, a service frame of an upper layer is converted to an Ethernet frame while an inter-frame gap (IFG) interval is maintained and the Ethernet frame is transmitted. Herein, a transmission is performed according to a generation sequence regardless of the kind of the upper service frames. That is, an Ethernet is a technology generally used when data are transmitted between different terminals or different users.

Such an Ethernet has not been known to be sufficient for transmitting a dynamic image and voice which are sensitive to a transmission time delay. However, recently, a technology has been discussed, which can transmit synchronous data such as image and voice by means of the existing Ethernet. Hereinafter, an Ethernet for transmission of data as described above will be called a "synchronous Ethernet."

Figure 1:
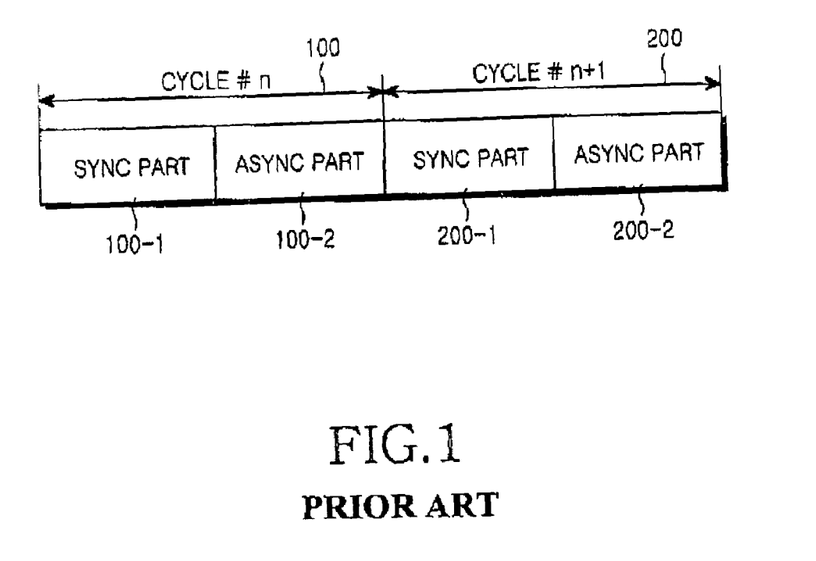
FIG. 1 is a view showing the transmission cycle of a synchronous Ethernet.

FIG. 1 is a view showing the transmission cycle of a synchronous Ethernet.

As shown in FIG. 1, in the synchronous Ethernet currently discussed, each of the transmission cycles n, 100, and n+1, 200, for data transmission has one cycle of 125 μsec and includes a synchronous (sync) part 100-1 or 200-1 for transmission of synchronous data and an asynchronous (async) part 100-2 or 200-2 for transmission of asynchronous data.

Specifically, the sync part 100-1 or 200-1 for the transmission of the synchronous data is a data part having the highest priority in the transmission cycle. According to a proposal currently discussed, ten (10) sub-synchronous frames, each of which is constructed using 738 bytes, are contained in the sync part 100-1 or 200-1 as a default.

Further, the async part 100-2 or 200-2 for the transmission of the asynchronous data is constructed in a remainder portion of the frame excluding the sync part 100-1 or 200-1. Herein, variable asynchronous data are contained in a corresponding portion by the frame.

In the synchronous Ethernet currently discussed as described above, asynchronous data and synchronous data are contained in the conventional Ethernet frame and are then transmitted.

Figure 2:
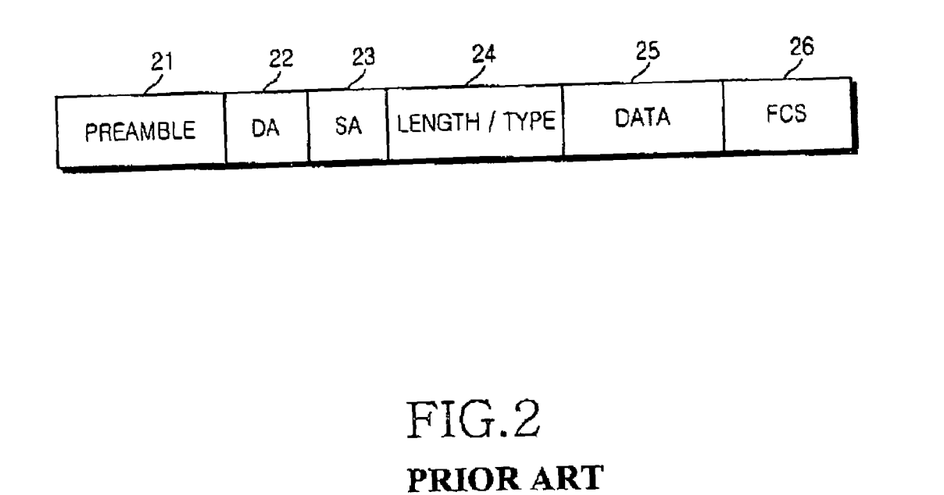
FIG. 2 is a view showing the structure of the conventional Ethernet frame.

FIG. 2 is a view showing the structure of the conventional Ethernet frame.

As shown in FIG. 2, the conventional Ethernet frame includes a preamble field 21, a destination address (DA) field 22, a source address (SA) field 23, a length/type field 24, a data field 25 for indicating data of the frame, and a frame check sequence field (FCS) 26. The preamble field 21 is constructed using eight bytes and indicates the start and the end of the frame, the destination address field 22 is constructed using six bytes and indicates the media access control ('MAC') address of a destination to which the frame must be transmitted, and the source address field 23 is constructed using six bytes and indicates the MAC address of a station transmitting the frame. Further, the length/type field 24 is constructed using two bytes and indicates the length information of the data of the frame and the protocol type of the frame, and the frame check sequence (FCS) field 26 is constructed using four bytes and is disposed at the end of each frame. The FCS field is used for detecting an error when information is transmitted according to each frame in data communication.

When both synchronous data and asynchronous data are transmitted through the aforementioned structure of the conventional Ethernet frame, synchronization or non-synchronization may be confirmed through the length/type field 24.

A layer structure for processing the Ethernet frame as described above will be described with reference to FIG. 3.

Figure 3:
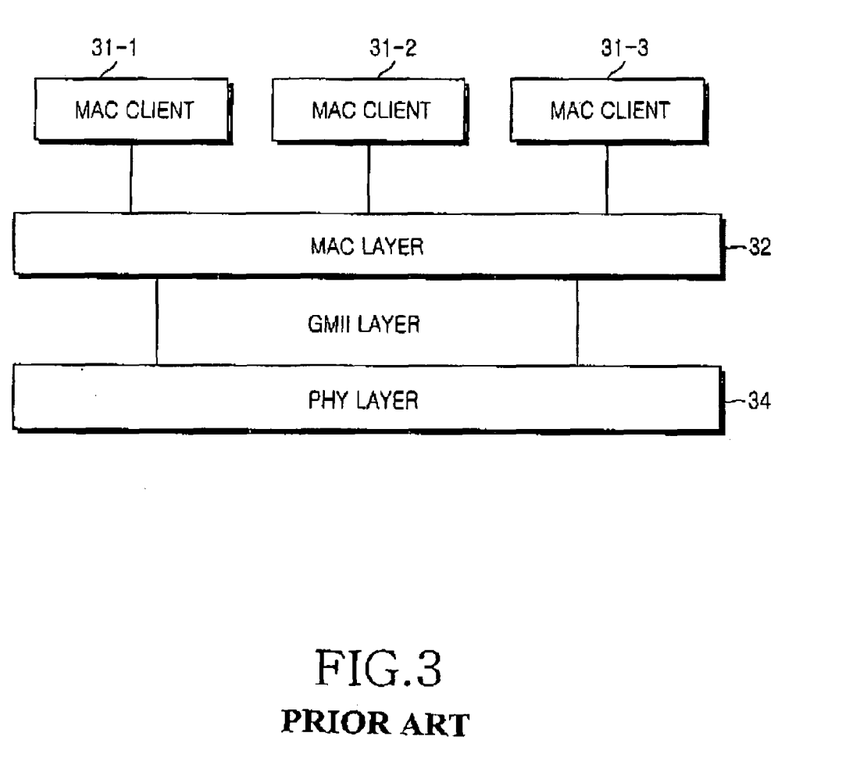
FIG. 3 is a view showing the layer structure of an Ethernet network to which the present invention is applied.

FIG. 3 is a view showing the layer structure of an Ethernet network to which the present invention is applied.

The layer structure of the Ethernet network includes a physical (PHY) layer 34 which is a first layer of an OSI 7 stack, a MAC layer 32 which is the sub-layer of a data link layer and is a second layer of the OSI 7 layer stack, and MAC clients 31-1 to 31-3 which are upper layers of the stack. A Gbps (gigabit/second) media independent interface ('GMII') layer 33 is an interface layer between the PHY layer 34 and the MAC layer 32.

An operation of each layer will now be described. First, the PHY layer 34 includes a physical medium attachment (PMA), a physical medium dependent (PMD), and a physical coding sub-layer (PCS) and transmits inputted Ethernet data to the upper MAC layer 32. The MAC layer 32 confirms or determines information, such as the destination address and the length/type, from the transmitted Ethernet data and transmits the information to the corresponding MAC client 31-1, 31-2 or 31-3. These operations are well-known in the art and need not be discussed or shown in detail herein.

A description when the synchronous Ethernet, as described in FIG. 1, is applied to the aforementioned layer structure is as follows. First, a maximum of 16 synchronous Ethernet frames having a fixed length and including a maximum of 192 slots, each of which is constructed using four bytes, are transmitted in a transmission interval for synchronous data in the synchronous Ethernet. When the transmission of such synchronous frames is completed in one cycle, asynchronous frames are transmitted during the remaining interval of the corresponding cycle. In such a superframe scheme, in the case of the conventional synchronous Ethernet, a synchronous frame and an asynchronous frame are distinguished from each other through the length/type field 24 contained in an overhead. Accordingly, synchronous data and asynchronous data are distinguished from each other and processed in the MAC layer 32.

However, when such a general network layer structure is employed, a processing is performed even for synchronous data through the destination address information and the length/type information. Therefore, unnecessary overhead is added, thereby reducing the transmission efficiency. That is, since the synchronous data are data containing, for example, video or audio broadcasting information and transmitted in a broadcasting scheme, and each device approves or excludes corresponding data, it is unnecessary to transmit the data through an address processing, etc., in the MAC layer.

Accordingly, it is necessary to prevent unnecessary overhead from being added by distinguishing and processing synchronous data and asynchronous data in the PHY layer 34. Further, it is necessary to carry out research on a data processing scheme enabling various types of synchronous data to be transmitted according to each type of the synchronous data.

SUMMARY OF THE INVENTION

Accordingly, the present invention has been made to solve the above-mentioned problems occurring in the prior art and provides additional advantages, by providing a data frame construction method and a data processing method according to the data frame in a synchronous Ethernet, which prevent transmission efficiency from being deteriorated due to unnecessary overhead and enable various synchronous data to be processed by distinguishing a synchronous frame and an synchronous frame from each other in a physical layer.

In order to accomplish the aforementioned object, according to one aspect of the present, there is provided a method for constructing a frame of data for transmission by each Ethernet device in a synchronous Ethernet, the method comprising the steps of receiving the data for transmission and confirming whether or not the data for transmission are synchronous data by each Ethernet device, when the received data are confirmed synchronous data, marking that the data are synchronous data in a preamble of the frame and constructing a synchronous frame by including the received data into a data portion of the frame which does not contain a MAC header and when the received data are confirmed asynchronous data, marking that the data are asynchronous data in the preamble of the frame and constructing an asynchronous frame by including the received data into a data portion of the frame containing a MAC header.

In order to accomplish the aforementioned object, according to one aspect of the present, there is provided a method for enabling each Ethernet device to process inputted data in a synchronous Ethernet, the method comprising the steps of receiving the data by the Ethernet device and confirming whether or not each frame of the data is a synchronous frame when the frame is the synchronous frame confirming whether or not slots in the corresponding frame is a slot in which a slot routing path has been set for the Ethernet device when the slot is the slot in which the slot routing path has been set, transmitting the slot through a corresponding slot routing path, and when the slot is not the slot in which the slot routing path has been set, transmitting the slot to another Ethernet device through a physical layer of the Ethernet device and when the frame is an asynchronous frame, transmitting the corresponding frame to a MAC layer of the Ethernet device.

BRIEF DESCRIPTION OF THE DRAWINGS

The above and other features and advantages of the present invention will be more apparent from the following detailed description taken in conjunction with the accompanying drawings, in which.

DETAILED DESCRIPTION

Hereinafter, an embodiment according to the present invention will be described with reference to the accompanying drawings. The same reference numerals are used to designate the same elements as those shown in other drawings. For the purposes of clarity and simplicity, a detailed description of known functions and configuration incorporated herein are omitted as it may make the subject matter of the present invention unclear.

Figure 4A:
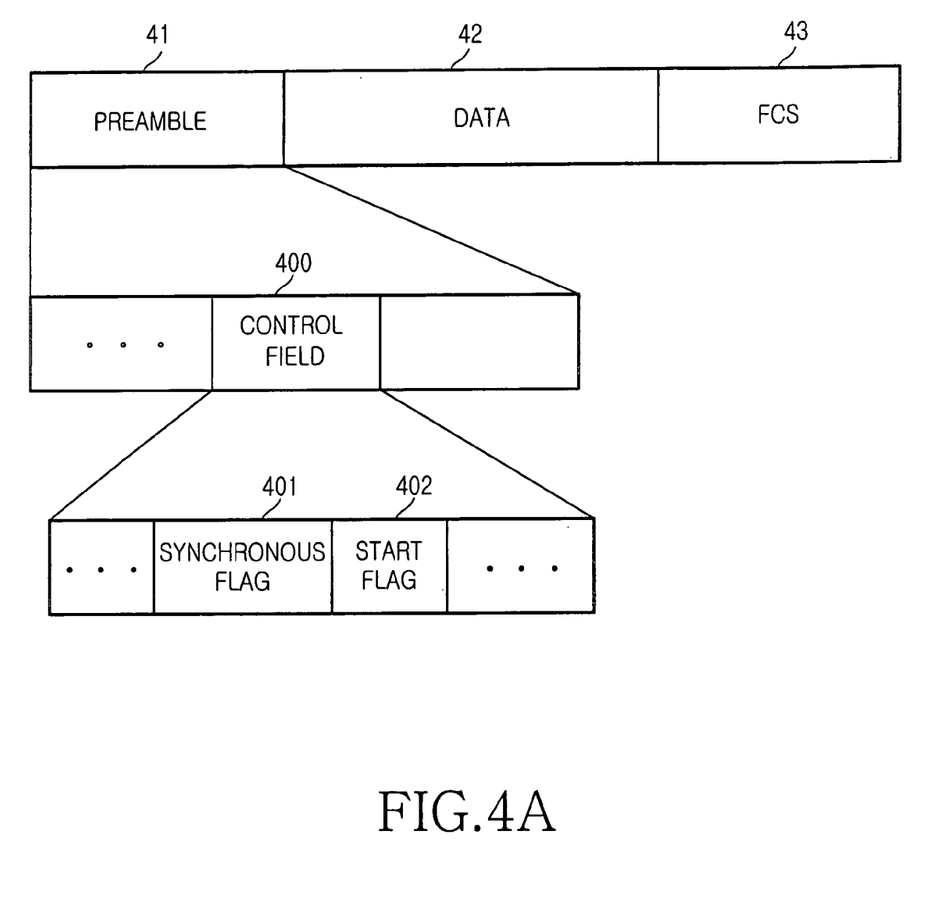
FIGS. 4a and 4b are views showing the structure of a synchronous Ethernet frame according to an embodiment of the present invention.
Figure 4B:
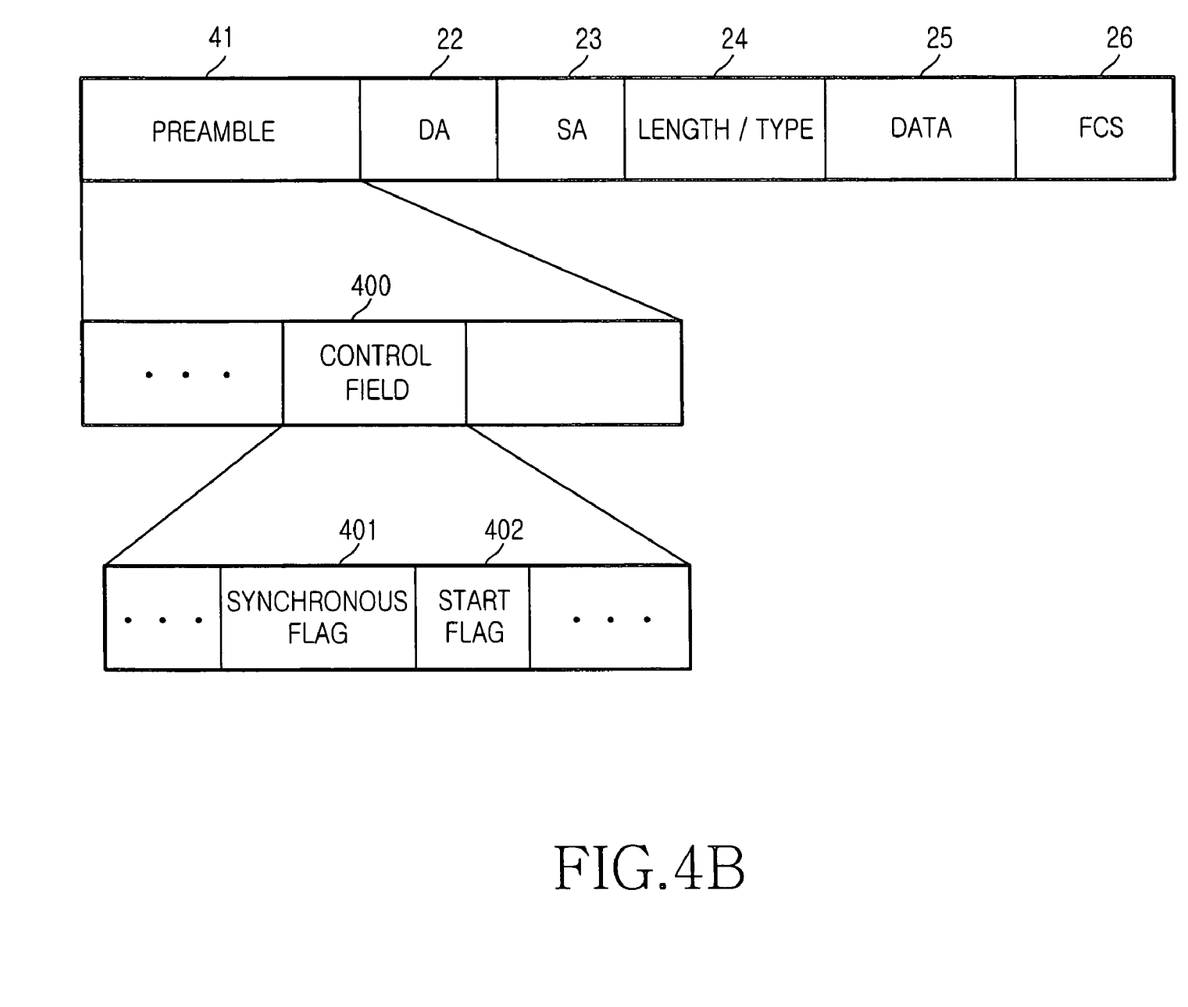

FIGS. 4a and 4b are views showing the structure of a synchronous Ethernet frame according to an embodiment of the present invention.

As shown in FIG. 4a, the synchronous frame in the synchronous Ethernet according to the present invention includes a preamble field 41, a data field 42 for indicating data to be transmitted and a frame check sequence field 43. The frame check sequence (FCS) field 43 is disposed at the end of each frame and is used for detecting an error when information is transmitted according to each frame in data communication. In particular, the synchronous frame according to the present invention includes a control field 400 contained in the preamble field 41 in order to determine whether or not data are synchronous data in a PHY layer. The control field 400 includes a synchronous flag field 401 for confirming whether or not a frame is a synchronous frame. Further, the control field 400 according to an embodiment of the present invention may further include a start flag filed 402 for indicating the start of a super frame, in addition to the synchronous flag field 401.

Herein, since a synchronous frame includes a plurality of data slots in the data field 42 and a slot routing path is set by a separate signal scheme in each data slot, it is possible for an upper client to confirm whether or not the slot is the slot of the upper client through the slot routing path instead of a MAC address. Accordingly, since it is unnecessary to add a MAC header, overhead can be reduced. Therefore, bandwidth can be easily ensured in data transmission and transmission efficiency can be improved. Further, since a MAC header is not contained, it is possible to transmit the data field 42 by a scheme different from the Ethernet. Accordingly, synchronous data can be transmitted by various schemes.

In the conventional Ethernet frame, the preamble filed 41 is constructed using eight bytes and includes a reserved field of two bytes. The control field 400 according to the present invention may be constructed by means of such a reserved field, or the control field 400 according to an embodiment of the present invention may be contained in a predetermined field for indicating another function. That is, the embodiment of the present invention may also be achieved by including the synchronous flag field 401 for confirming whether or not a frame is a synchronous frame into a predetermined field according to a function of the conventional Ethernet frame.

Meanwhile, as shown in FIG. 4*b*, an asynchronous frame in the synchronous Ethernet according to the present invention includes a preamble field 41, a destination address field 22, a source address field 23, a length/type field 24, a data field 25 for indicating data of the frame, and a frame check sequence field 26. The destination address field 22 is constructed using six bytes and indicates the MAC address of a destination to which the frame must be transmitted and the source address field 23 is constructed using six bytes and indicates the MAC address of a station transmitting the frame. Further, the length/type field 24 is constructed using two bytes and indicates the length information of the data of the frame and the protocol type of the frame, and the frame check sequence field 26 is constructed using four bytes and is disposed at the end of each frame. The FCS 26 is used for detecting an error when information is transmitted according to each frame in data communication. In particular, the asynchronous frame according to the present invention includes a control field 400 contained in the preamble field 41 in order to determine whether or not data are synchronous data in a PHY layer. The control field 400 includes a synchronous flag field 401 for confirming whether or not a frame is a synchronous frame. Further, the control field 400 according to an embodiment of the present invention may further include a start flag filed 402 for indicating the start of a super frame, besides the synchronous flag field 401.

In the conventional Ethernet frame, the preamble filed 41 is constructed using eight bytes and includes a reserved field of two bytes. The control field 400 according to the present invention may be constructed by means of such a reserved field, or the control field 400 according to an embodiment of the present invention may be contained in a predetermined field for indicating another function. That is, the embodiment of the present invention may also be achieved by including the synchronous flag field 401 for confirming whether or not the frame is a synchronous frame of a predetermined field according to a function of the conventional Ethernet frame.

In order to construct the data frame for transmission in the synchronous Ethernet as described above, the following process is performed.

First, each Ethernet device receives data for transmission and determines or confirms whether or not the data are synchronous data. As a result of the confirmation, when the received data are the synchronous data, the Ethernet device marks that the data are the synchronous data in the preamble of the frame and includes the received data into the data portion of the frame which does not contain a MAC header. In contrast, when the received data are asynchronous data, the Ethernet device marks that the data are the asynchronous data in the preamble of the frame and includes the received data into the data portion of the frame containing a MAC header.

As described above, the synchronous frame and the asynchronous frame in the synchronous Ethernet according to the present invention have different structures. In receiving and processing a frame in a PHY layer according to such different structures, whether each frame is a synchronous frame or an asynchronous frame is determined or confirmed through a preamble. As a result of the determination (confirmation), the frame is transmitted to upper layers different from each other.

Figure 5:
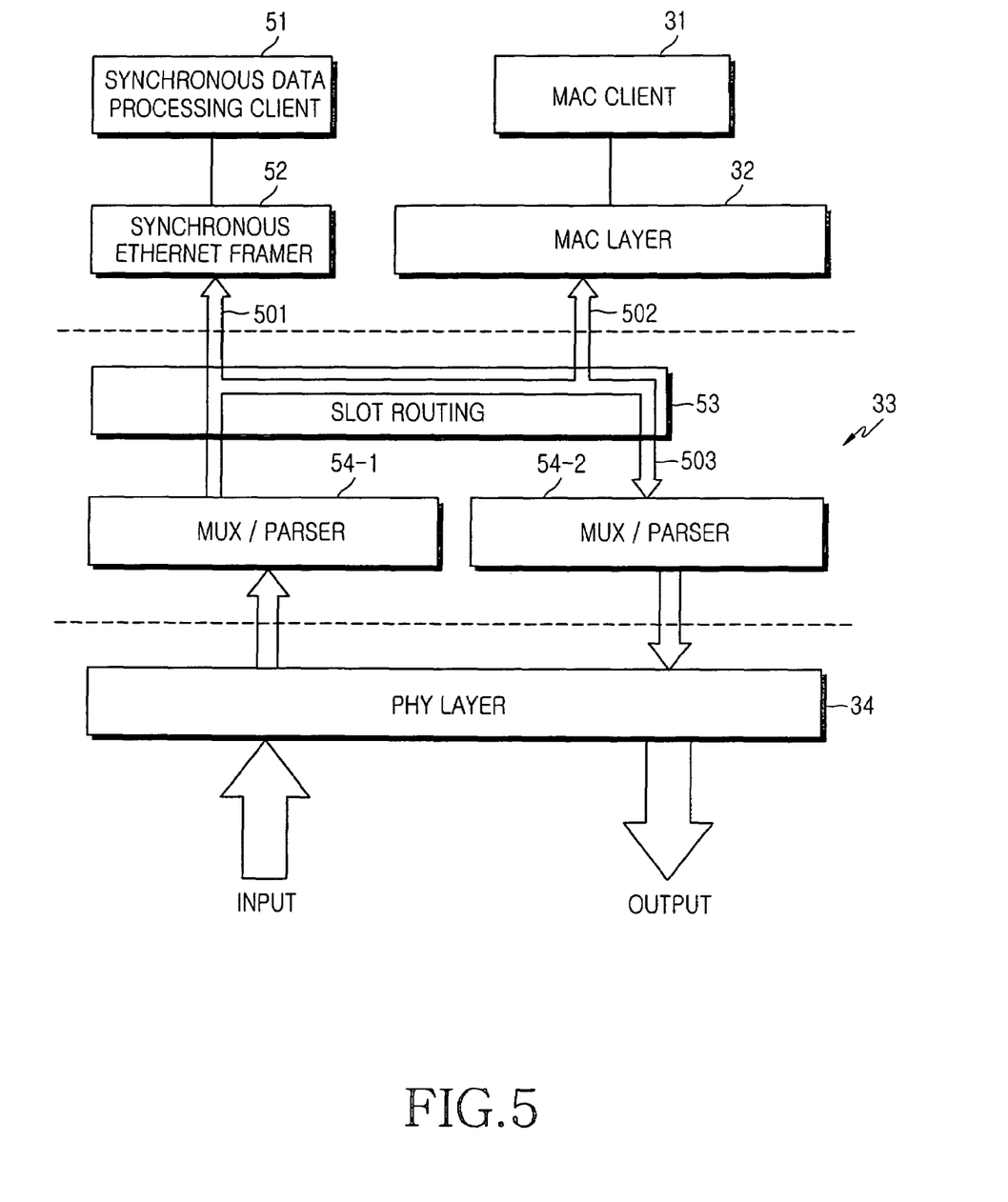
FIG. 5 is a view showing the layer structure of a synchronous Ethernet network according to an embodiment of the present invention.

FIG. 5 is a view showing the layer structure of a synchronous Ethernet network according to an embodiment of the present invention.

As shown in FIG. 5, the layer structure of the synchronous Ethernet network according to the present invention may be classified into two structures for processing an asynchronous frame and a synchronous frame. First, the processing for the asynchronous frame is accomplished through a PHY layer 34, which is the first layer of an OSI 7-layer stack, a MAC layer 32, which is the sub-layer of a data link layer, and is the second layer of the OSI 7-layer stack, a MAC client 31 which is an upper layer of the stack, and an GMII layer 33 which is an interface layer between the PHY layer 34 and the MAC layer 32.

Meanwhile, the processing for the synchronous frame is accomplished through the PHY layer 34, which is the first layer of the OSI 7-layer stack, a synchronous Ethernet framer 52 for processing for a synchronous Ethernet frame, a synchronous data processing client 51 which is an upper layer, and the GMII layer 33 which is an interface layer between the PHY layer 34 and the synchronous Ethernet framer 52.

The GMII layer 33 which is an interface layer includes an MUX/parser 54-1, a MUX/parser 54-2, and a slot routing section 53. The MUX/parser 54-1 performs multiplexing and a parsing operations for input data, the MUX/parser 54-2 performs multiplexing and a parsing operations for output data, and the slot routing section 53 routes the input data from the MUX/parser 54-1 and transmits output data from an upper layer to the MUX/parser 54-2.

A data processing process according to the aforementioned layer structure will be described hereinafter.

According to an embodiment of the present invention, each frame in the synchronous Ethernet is classified into a synchronous frame and an asynchronous frame according to a synchronous flag contained in the preamble. Accordingly, when one frame has been received, the preamble of the corresponding frame is inspected. As a result of the inspection, when the synchronous flag is determined to be in a first state, e.g., deactivated, the received frame is considered an asynchronous frame. Accordingly, the received frame is transmitted to the MAC layer 32 along a path 502.

In contrast, when the synchronous flag is determined to be in a second state, e.g., activated, the received frame is considered a synchronous frame. Accordingly, the received frame is transmitted to another device through a path 53 and simultaneously a slot routing operation is performed for each slot contained in the data field of the synchronous frame. Herein, when a slot corresponds to a corresponding device, the received frame is transmitted to the synchronous Ethernet framer 52 of the corresponding device along a path 501.

That is, in the present invention, a synchronous frame and an asynchronous frame can be distinguished from each other in the lower layer of a MAC layer by means of the preamble portion of a frame. Further, since the synchronous frame is transmitted to all devices (broadcast) and a routing path has been set in each of the multiple slots contained in each frame according to a separate signal scheme, transmission using a MAC address is unnecessary. That is, according to an embodiment of the present invention, it is unnecessary to use a MAC address for the synchronous frame. Accordingly, frames can be distinguished from each other and processed in the lower layer of the MAC layer, in contrast with the layer structure of the conventional synchronous Ethernet.

Figure 6:
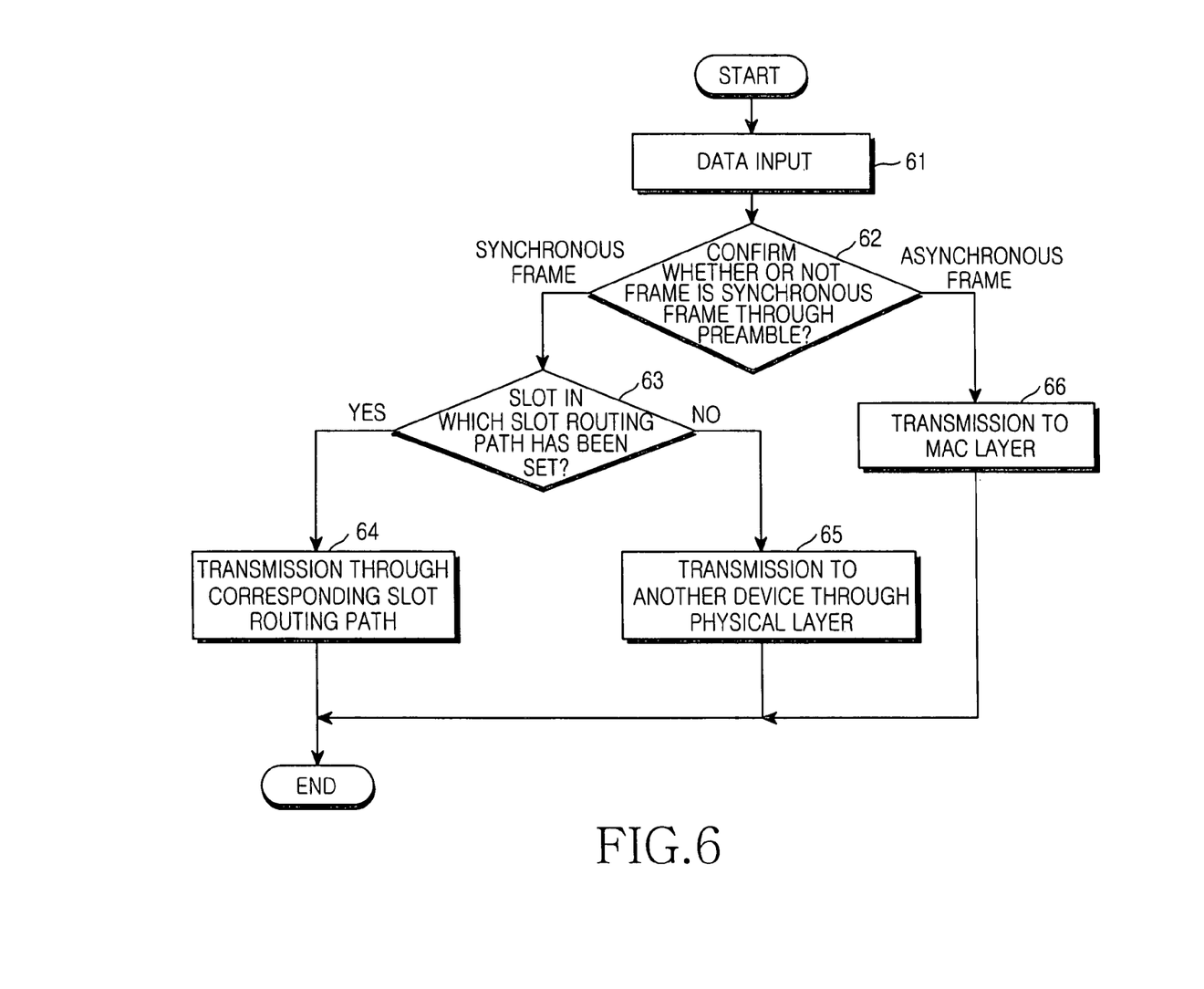
FIG. 6 is a flow diagram illustrating a method by which each Ethernet device processes inputted data in a synchronous Ethernet according to the present invention.

FIG. 6 is a flow diagram illustrating a method by which each Ethernet device processes inputted data in a synchronous Ethernet according to the present invention.

First, when the Ethernet device in the synchronous Ethernet according to the present invention receives data from a physical layer at block 61, the Ethernet device determines or confirms whether or not each frame of the received data is a synchronous frame by means of the preamble of the corresponding frame at block 62. That is, the confirmation can be performed through the synchronous flag as shown in FIGS. 4*a* and 4*b*.

As a result of the confirmation at block 62, when the frame is the synchronous frame, an interface layer (e.g., GMII layer) confirms whether or not a slot routing path to a corresponding device has been set in each slot in the frame, through a slot routing function, at block 63. As a result of the confirmation at block 63, when the slot routing path to the corresponding device has been set in said each slot, the interface layer transmits the received data to an upper synchronous data processing client through the corresponding slot routing path at block 64. In contrast, when the slot routing path to the corresponding device has not been set in each slot, the interface layer transmits the received data to another Ethernet device through a physical layer at block 65.

Herein, confirming whether or not the slot routing path to the corresponding device has been set by means of the slot routing function represents the confirmation (determination) of the slot routing path having been set by a separate signal scheme for each of multiple slots contained in the corresponding synchronous frame received in the interface layer, i.e., the confirmation of a slot for a corresponding Ethernet device. After confirming the slot routing path in this manner, the interface layer receives the slot for the corresponding device from among multiple slots contained in the synchronous frame and transmits the received slot to an upper layer. In contrast, in the case of slots except for the slot for the corresponding device, the interface layer transmits the slots to another Ethernet device through the physical layer.

Meanwhile, when the frame is an asynchronous frame as determined at block 62, the interface layer transmits the inputted data to the MAC layer for a processing in the MAC layer at block 66.

As described above, in the present invention, a synchronous frame and an asynchronous frame are distinguished in a physical layer, so that transmission efficiency due to unnecessary overhead can be prevented from being deteriorated and various synchronous data can be processed.

The above-mentioned method according to the present can be realized as software and can be stored in a recording medium such as a CD ROM, an RAM, a floppy disk, a hard disk, or a magneto-optical disk, so that a user can read such software by using a computer.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for constructing a frame of data for transmission by each Ethernet device in a synchronous Ethernet, the method comprising the steps of:
   receiving the data for transmission and confirming whether or not the data for transmission are synchronous data, wherein
   when the received data are synchronous data, marking the data as synchronous data in a preamble of the frame and constructing a synchronous frame by including the received data into a data portion of the frame which does not contain a MAC header; and
   when the received data are asynchronous data, marking the data as asynchronous data in the preamble of the frame and constructing an asynchronous frame by including the received data into a data portion of the frame containing a MAC header.

2. The method as claimed in claim 1, wherein the preamble includes a synchronous data flag field constructed by a predetermined number bits in order to mark the data.

3. The method as claimed in claim 1, wherein the MAC header comprises a destination address field constructed using six bytes to indicate an MAC address of a destination to which the frame must be transmitted, a source address field constructed using six bytes to indicate an MAC address of a station transmitting the frame, and a length/type field constructed using two bytes to indicate length information of the data of the frame and a protocol type of the frame.

4. The method as claimed in claim 1, wherein the preamble includes a frame start flag constructed using a predetermined number of bits, the frame start flag indicating a start of a transmission cycle of the synchronous Ethernet.

5. A method for enabling each Ethernet device to process inputted data in a synchronous Ethernet, the method comprising the steps of:
   a) receiving the data by the Ethernet device and confirming whether or not each frame of the data is a synchronous frame;
   b) when the frame is the synchronous frame failing to contain a MAC header, confirming whether or not a slot in the corresponding frame is a slot in which a slot routing path has been set for the Ethernet device;
   c) when the slot in the corresponding frame is confirmed to be a slot in which the slot routing path has been set, transmitting the slot through a corresponding slot routing path, and when the slot is not a slot in which the slot routing path has been set, transmitting the slot to another Ethernet device through a physical layer of the Ethernet device; and
   d) when the frame is an asynchronous frame, transmitting the corresponding frame to a MAC layer of the Ethernet device.

6. The method as claimed in claim 5, wherein the step of confirming further comprises the step of:
   examining a synchronous flag field in a frame preamble, wherein the flag field is in a first state to indicate synchronous data and a second state to indicate asynchronous data.

7. An apparatus in an Ethernet device for constructing a frame of data for transmission in a synchronous Ethernet format, the apparatus comprising:
   a processor in communication with a memory, the processor executing code, which is stored in said memory, for:
   receiving data for transmission;
   determining whether data for transmission are synchronous data; and
   marking in a preamble of the frame when the data are synchronous and constructing a synchronous frame by including the received data into a data portion of the frame which does not contain a MAC header.

8. The apparatus as claimed in claim 7, wherein the processor further executing code for:
   marking in a preamble of the frame when the data are asynchronous data and constructing an asynchronous frame by including the received data into a data portion of the frame containing a MAC header.

9. The apparatus as claimed in claim 7, wherein the preamble includes a synchronous data flag field constructed using a predetermined number bits.

10. The apparatus as claimed in claim 9, wherein the synchronous data flag is in a first state when the data is synchronous and in a second state when the data is asynchronous.

11. The apparatus as claimed in claim 7, wherein the MAC header comprises a destination address field constructed using six bytes to indicate an MAC address of a destination to which the frame must be transmitted, a source address field constructed using six bytes to indicate an MAC address of a station transmitting the frame, and a length/type field constructed using two bytes to indicate length information of the data of the frame and a protocol type of the frame.

12. The apparatus as claimed in claim 7, wherein the preamble includes a frame start flag constructed using a predetermined number of bits, the frame start flag indicating a start of a transmission cycle of the synchronous Ethernet.

13. The apparatus as claimed in claim 7, further comprising:

an input/output device in communication with the processor for receiving/transmitting the data.

14. The apparatus as claimed in claim 7, wherein the code is provided on a readable-medium readable by the processor.

* * * * *